US009405674B2

(12) United States Patent
Fujiki et al.

(10) Patent No.: US 9,405,674 B2
(45) Date of Patent: Aug. 2, 2016

(54) ADDRESS GENERATING CIRCUIT AND ADDRESS GENERATING METHOD

(71) Applicant: KABUSHIKI KAISHA TOSHIBA, Minato-ku (JP)

(72) Inventors: Takahiro Fujiki, Kanagawa (JP); Tetsuro Iwamura, Kanagawa (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 299 days.

(21) Appl. No.: 14/016,629

(22) Filed: Sep. 3, 2013

(65) Prior Publication Data
US 2014/0189213 A1 Jul. 3, 2014

(30) Foreign Application Priority Data

Dec. 27, 2012 (JP) ................................. 2012-284134

(51) Int. Cl.
*G06F 13/00* (2006.01)
*G06F 12/02* (2006.01)
*G06F 12/08* (2016.01)
*G06F 12/06* (2006.01)

(52) U.S. Cl.
CPC ........ *G06F 12/0246* (2013.01); *G06F 12/0607* (2013.01); *G06F 12/0851* (2013.01); *G06F 2212/7202* (2013.01); *Y02B 60/1225* (2013.01)

(58) Field of Classification Search
CPC ............ G06F 12/0607; G06F 12/0851; G06F 12/0246; G06F 2212/7202; Y02B 60/1225
See application file for complete search history.

(56) References Cited

U.S. PATENT DOCUMENTS 5,263,003 A 11/1993 Cowles et al.
5,761,695 A * 6/1998 Maeda ................ G06F 12/0607
711/118

FOREIGN PATENT DOCUMENTS

| JP | 06-202942 A | 7/1994 |
| JP | 09-081453 A | 3/1997 |
| JP | 2000-285017 A | 10/2000 |
| JP | 2006-215961 A | 8/2006 |
| JP | 2008-065859 A | 3/2008 |
| JP | 2008-152687 A | 7/2008 |

OTHER PUBLICATIONS

Japanese Office Action issued on Oct. 27, 2015 in corresponding Japanese Application No. 2012-284134, along with English translation thereof.

* cited by examiner

*Primary Examiner* — Ernest Unelus
(74) *Attorney, Agent, or Firm* — White & Case LLP

(57) ABSTRACT

An address generating circuit according to an embodiment includes a register that maintains a partition address set by a CPU, a comparator that determines whether a designated address designated by the CPU designates the interleaved area or the non-interleaved area, a selection signal generating unit that generates the selection signal based on a least significant bit of the designated address in a case of the interleaved area and generates the selection signal based on a high-order bit other than the least significant bit of the designated address in a case of the non-interleaved area, and a physical address generating unit that generates the physical address acquired by excluding the least significant bit from the designated address in a case of the interleaved area and generates the physical address acquired by excluding the high-order bit from the designated address in a case of the non-interleaved area.

20 Claims, 4 Drawing Sheets

FIG.2

| REGION | SECTOR SIZE | PAGE SIZE |
|---|---|---|
| INTERLEAVED AREA | 8K BYTES | 256 BYTES |
| NON-INTERLEAVED AREA | 4K BYTES | 128 BYTES |

ADDRESS GENERATING CIRCUIT AND ADDRESS GENERATING METHOD

CROSS-REFERENCE TO RELATED APPLICATIONS

This application is based upon and claims the benefit of priority from Japanese Patent Application No. 2012-284134, filed on Dec. 27, 2012; the entire contents of which are incorporated herein by reference.

FIELD

The present embodiment, generally, relates to an address generating circuit and an address generating method.

BACKGROUND

In flash memories, it is necessary to erase data in units of blocks before data is written, and it takes a long time to erase data with respect to an operating clock of the system. As a method for shortening the data erasure time, there are a method of simultaneously erasing data of a plurality of storage device banks and a method of hiding a erasure time by overlapping data erasures of a plurality of storage device banks in an interleaved mode. As the number of storage device banks for overlapping increases, a higher speed can be implemented. Also for reading a memory, by interleaving a plurality of storage device banks, the access time overlaps each other, whereby the processing can be performed at a higher speed.

BRIEF DESCRIPTION OF THE DRAWINGS

FIG. 2 is a diagram that illustrates an example of sector sizes and page sizes that are units of data erasing and data reading in the interleaved area and the non-interleaved area according to this embodiment;

DETAILED DESCRIPTION

Figure 1:
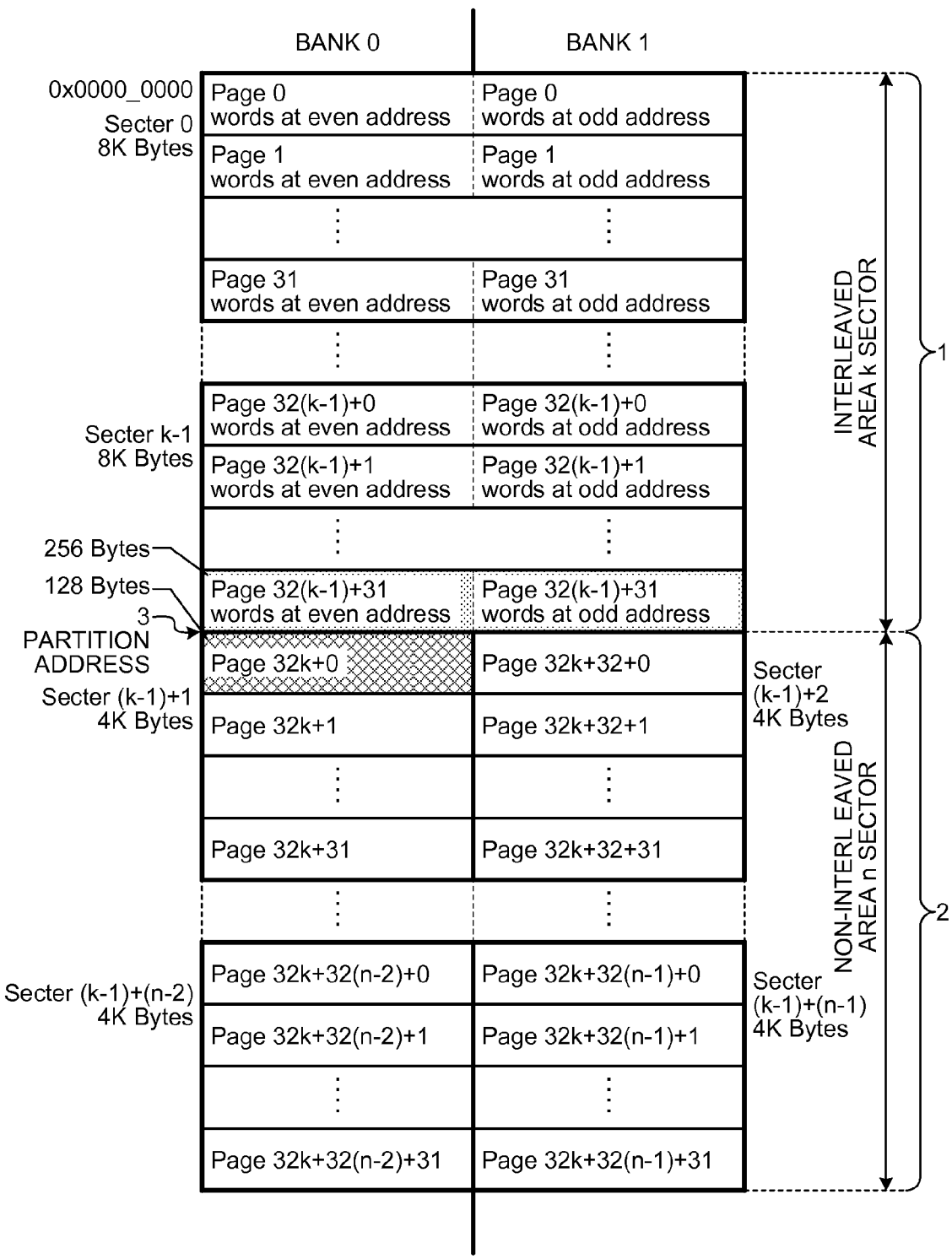
FIG. 1 is a diagram that illustrates an example of the relation among each bank, an interleaved area, a non-interleaved area, and partition addresses according to this embodiment.

An address generating circuit according to an embodiment of the present invention provides a bank selection signal representing a selection of a first bank or a second bank and a physical address for a non-volatile storage unit that includes the first bank and the second bank, alternately stores data of consecutive addresses in the first bank and the second bank in units of words in an interleaved area, and consecutively stores the data in the first bank or the second bank in a non-interleaved area up to a unit of a sector larger than a unit of the word. The address generating circuit according to the embodiment includes a register that maintains a partition address set by a CPU, a comparator that determines whether a designated address designates the interleaved area or the non-interleaved area based on the designated address designated by the CPU and the partition address, a bank selection signal generating unit that generates the bank selection signal based on a least significant bit of the designated address in a case where the comparator determines the interleaved area and generates the bank selection signal based on a high-order bit other than the least significant bit of the designated address in a case where the comparator determines the non-interleaved area, and a physical address generating unit that generates the physical address acquired by excluding the least significant bit from the designated address in a case where the comparator determines the interleaved area and generates the physical address acquired by excluding the high-order bit from the designated address in a case where the comparator determines the non-interleaved area.

Hereinafter, an address generating circuit and an address generating method according to an embodiment will be described with reference to the accompanying drawings. However, the present invention is not limited to this embodiment.

EMBODIMENT

In a system having an on-chip flash memory such as a SIM (Subscriber Identity Module) card, there is restriction on the chip size, and it is difficult for a large number of memories to be included on-chip. In addition, a case where data of a plurality of storage device banks is simultaneously erased, or a case where the number of data erasures is large incurs a problem of decreasing the life of the flash memory and a problem of increasing power consumption in a system used for a cellular phone requiring low power consumption. The number of erasures of a flash memory is not unlimited.

A time is required for a data erasure, and accordingly, as there are more storage device banks of which data can be simultaneously erased, the effect of interleaving increases. In a system in which data of a plurality of storage device banks may not be simultaneously erased, data needs to be erased in a serial manner for each bank in the interleaved mode, whereby the erasure time increases by that much, and the number of erasures increases. In a non-interleaved access mode, a data erasure may be performed for only one bank that is used. However, on the other hand, a read access can be made at a higher speed in the interleaved mode.

As data to be written into the flash memory, there are data for which a high-speed access is necessary and data that is frequently rewritten, which have different characteristics of data. However, by employing any one of the memory access modes, it is difficult to have compatibility with both characteristics.

In a memory system physically configured by a plurality of banks, there is a method for increasing the speed of a memory access by configuring a plurality of banks as an interleaved memory. In a flash memory, data needs to be erased in units of blocks before data is written, and accordingly, a very long time is required for a data erasure with respect to an operating clock of the system, whereby the power consumption increases during the data erasure. In a system having a flash memory such as an SIM card on-chip, a large number of flash memories may not be physically included, and erasing data of a plurality of flash memories has a problem from the viewpoint of low power consumption.

In a semiconductor system having a flash memory such as an SIM card on-chip, the address generating circuit according to this embodiment provides a partition function of the flash memory. From this, the interleaved mode emphasizing the access speed of the flash memory and the non-interleaved mode emphasizing the data erasure time are realized in a same system, and a semiconductor device having a function for setting the division of an interleaved access area and a non-interleaved access area to be programmable can be provided.

As illustrated in FIG. 1, a flash memory that is physically configured by two banks (bank 0 and bank 1) is divided into an interleaved area 1 and a non-interleaved area 2. The address at which the division is performed is a partition address 3, and the division function is the partition function.

The flash memory is divided into blocks called sectors or pages, and the erasure of data is performed in units of sectors or pages. In a system in which accesses may not be made to both banks, the interleaved area 1 and the non-interleaved area 2, as illustrated in FIG. 2, have mutually-different sizes of sectors or pages that are units of data erasing and data reading. Since the size of the sector or the page of the interleaved area 1 is twice as much as that of the non-interleaved area 2, the data erasure time in the interleaved area is twice as much as that in the non-interleaved area.

For example, a read access or a write access to the flash memory may be performed only in units of a word (four bytes). The address input to the flash memory is a word address. Even word addresses of the interleaved area 1 are mapped into the bank 0, and odd word addresses are mapped into the bank 1. When consecutive word addresses are alternately accessed, the bank 0 and the bank 1 are alternately accessed in units of words. On the other hand, the non-interleaved area 2 is mapped into the banks 0 and 1 for each sector (4 K bytes). Addresses within a same sector are mapped into a same bank. The setting of the partition address 3 is set in units of 8 K bytes that form the unit of data erasing and data reading in the interleaved area 1 illustrated in FIG. 2.

Figure 3:
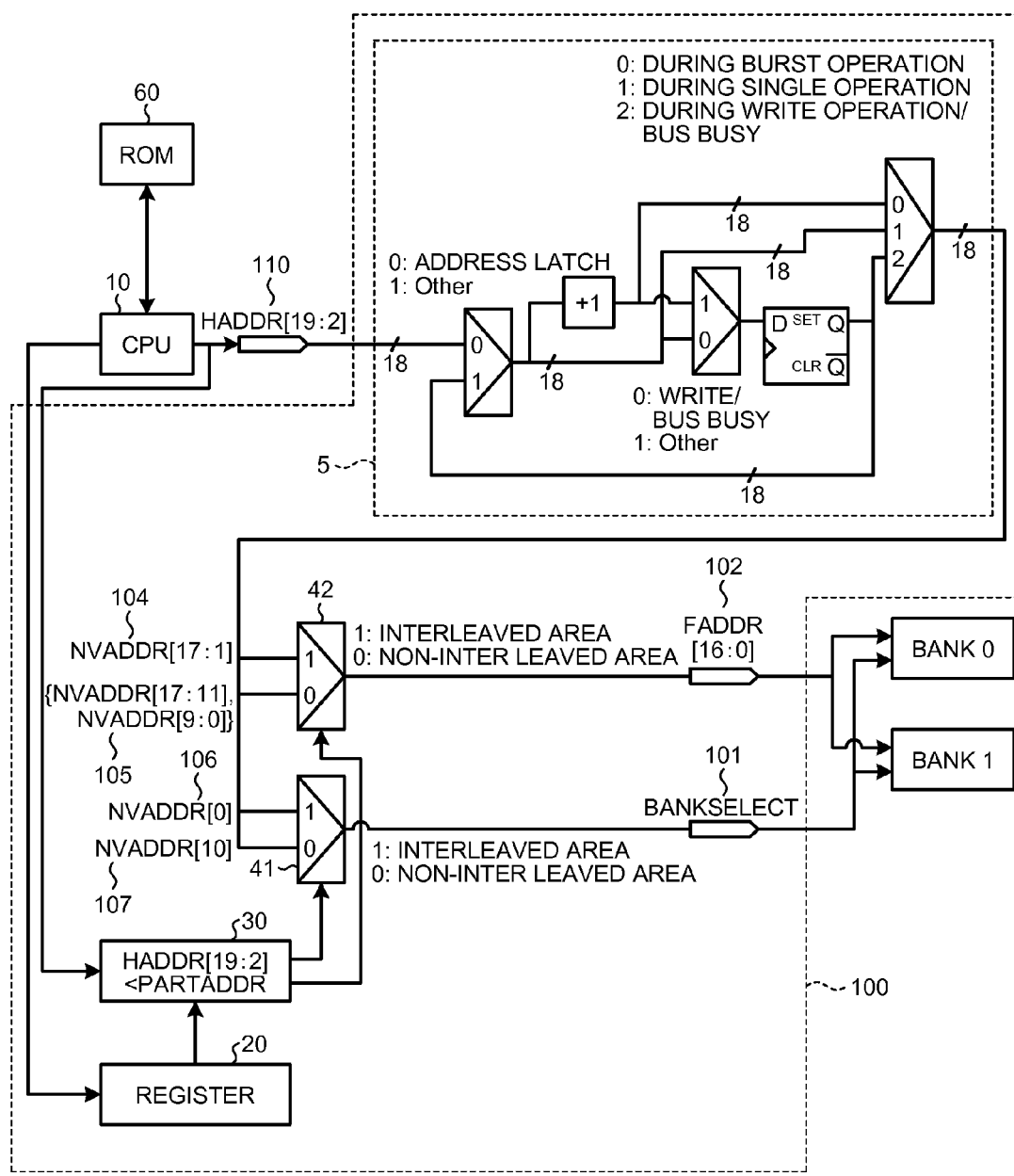
FIG. 3 is a diagram that illustrates the configuration of an address generating circuit according to this embodiment.

FIG. 3 illustrates an address generating circuit 100 generating a physical address that is input to a flash memory for implementing data storage as illustrated in FIG. 1 in a system having the flash memory such as an SIM card on-chip. When the flash memory has a total of 1 M bytes, each one of the banks 0 and 1 is 512 K bytes, and a 17 bit address of a physical address is necessary in the case of an access to a word. HADDR[19:2] 110 is an access address that is output by a CPU 10. This HADDR[19:2] 110 depends on the bus status and is transmitted to selectors 41 and 42 through a holding circuit 5 that holds address data when the bus is busy. A bank selection signal BANKSELECT 101 that is output from the selector 41 is a signal representing the selection of a specific bank. FADDR 102 that is output from the selector 42 is a physical address input to the flash memory (banks 0 and 1).

In this embodiment, for example, a user determines a value desired as a partition address 3 such that data requiring a high-speed access is arranged in the interleaved area 1, and data that is frequently rewritten is arranged in the non-interleaved area 2. More specifically, for example, a value of a partition address 3 that is set by the user in advance is written into an OS (operating system) recorded in a ROM 60 or the flash memory (banks 0 and 1), and the CPU 10 can write or read the value of the partition address 3 into or from a register 20.

The register 20 sets the partition address 3 to a comparator 30. For the selection of the interleaved area 1 or the non-interleaved area 2, an access address (designated address) supplied from the CPU 10 and the partition address 3 maintained in the register 20 are compared by the comparator 30. Then, for example, in a case where the access address is lower than the partition address 3, an access to the interleaved area 1 is determined, and otherwise, an access to the non-interleaved area 2 is determined.

When it is determined that the access address corresponds to the interleaved area 1 or the non-interleaved area 2, a physical address FADDR 102 and a bank selection signal BANKSELECT 101 can be determined. More specifically, the selectors 41 and 42 operate as below.

In a case where the access address is determined to correspond to the interleaved area 1 by the comparator 30, the selector 41 notifies the banks 0 and 1 of NVADDR[0] 106 that is a least significant bit of the access address as the bank selection signal BANKSELECT 101. On the other hand, in a case where the access address is determined to correspond to the non-interleaved area 2, the selector 41 notifies the banks 0 and 1 of NVADDR[10] 107 that is the value of the 10-th bit that is a bit having order higher than that of the access address as the bank selection signal BANKSELECT 101. The reason for using the value of the 10-th bit of the access address is that this bit is a bit representing conversion for every 4 K bytes that correspond to a data amount of the sector unit in the non-interleaved area 2. Accordingly, in a case where the non-interleaved area 2 is determined, the digit of the access address of which the banks 0 and 1 are notified as the bank selection signal BANKSELECT 101 depends on the amount of data in the unit of a sector that is consecutively written in the non-interleaved area 2 and is not necessarily limited to the 10-th bit.

In a case where the access address is determined to correspond to the interleaved area 1 by the comparator 30, the selector 42 notifies the banks 0 and 1 of NVADDR[17:1] 104 acquired by extracting NVADDR[0] 106, which is used as the bank selection signal BANKSELECT 101, from the access address as the physical address FADDR 102. On the other hand, in a case where the access address is determined to correspond to the non-interleaved area 2, the selector 42 notifies the banks 0 and 1 of {NVADDR[17:11], NVADDR [9:0]} 105 acquired by extracting NVADDR[10] 107, which is used as the bank selection signal BANKSELECT 101, from the access address as the physical address FADDR 102.

Figure 4:
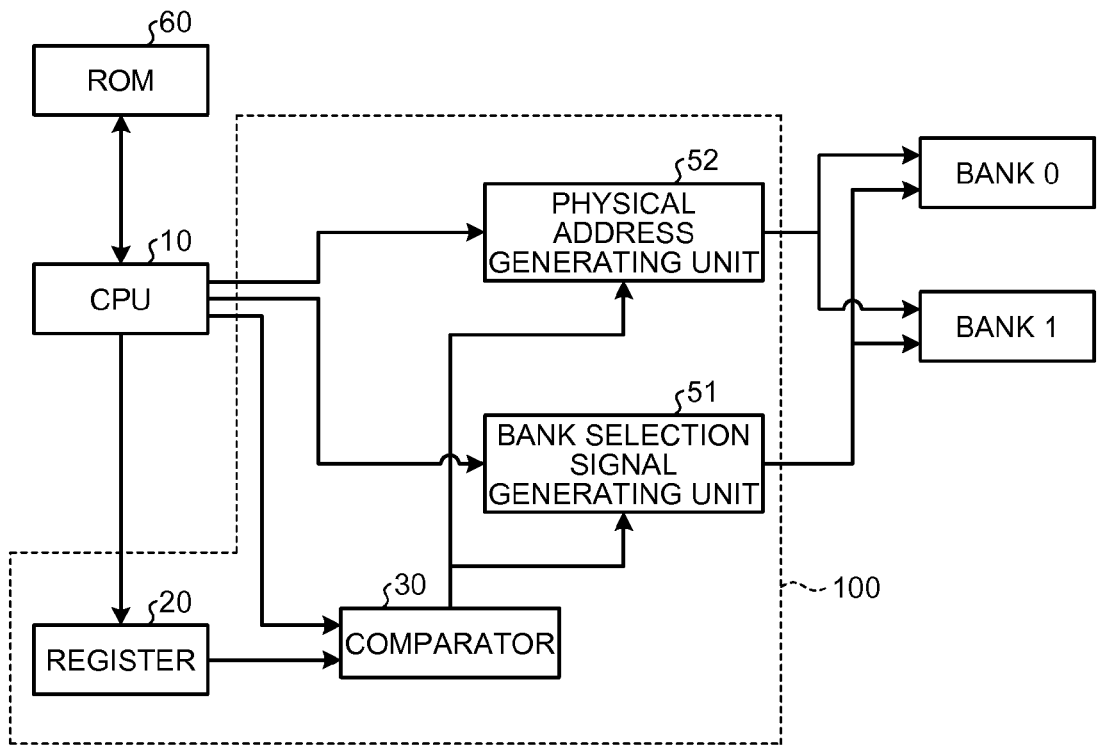
FIG. 4 is a block diagram that illustrates the functional configuration of the address generating circuit according to this embodiment.

FIG. 4 is a block diagram that illustrates the functional configuration of the address generating circuit 100 illustrated in FIG. 3. While a register 20 and a comparator 30 included in the address generating circuit 100 are the same as those illustrated in FIG. 3, a bank selection signal generating unit 51 is a functional block that is implemented by the holding circuit 5 and the selector 41 illustrated in FIG. 3, and a physical address generating unit 52 is a functional block that is implemented by the holding circuit 5 and the selector 42 illustrated in FIG. 3.

Figure 5:
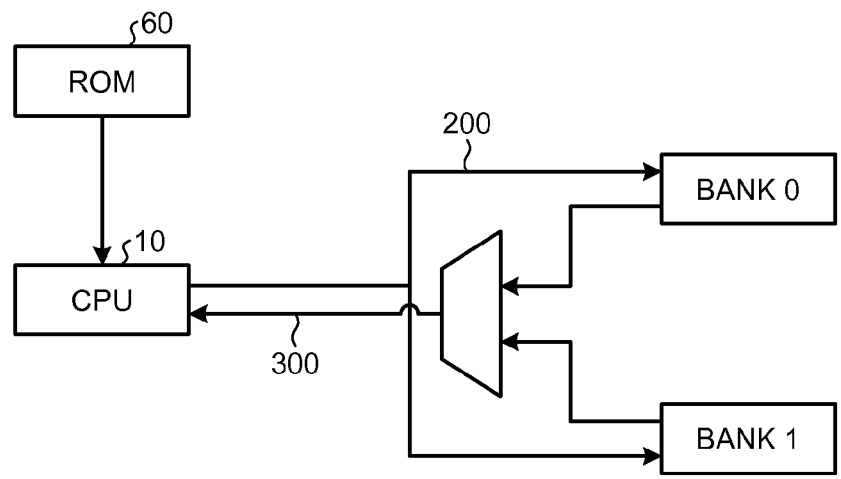
FIG. 5 is a diagram that illustrates the configuration of a read line and a write line between a CPU and a flash memory of a system according to this embodiment.

In a system having a flash memory such as an SIM card on-chip, in order for the CPU 10 to actually perform data reading and data writing for the banks 0 and 1 by designating an access address, in addition to the address generating circuit 100 illustrated in FIG. 4, a read line 300 (bus) and a write line 200 (bus) as illustrated in FIG. 5 are arranged in the banks 0 and 1, and data that is actually to be read or written is transmitted using the read line and the write line.

According to this embodiment, depending on the purpose of a user using the system, the division sizes of the interleaved area and the non-interleaved area can be set to be programmable. Data having a low rewriting frequency such as a command code is arranged in the interleaved area, whereby a high-speed read access thereto can be made. On the other hand, data having a high rewriting frequency is written into the non-interleaved area, whereby the data erasure time can decrease. Accordingly, by properly using the interleaved area and the non-interleaved area in accordance with the characteristics of data to be written, the processing time can be shortened.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An address generating circuit comprising:
a register configured to store a partition address indicating a boundary between an interleaved area and a non-interleaved area in a non-volatile storage unit, the non-volatile storage unit having a first bank and a second bank, the interleaved area being provided across the first bank and the second bank, the non-interleaved area being provided across the first bank and the second bank, a value of the partition address being rewritable by a CPU;
a comparator configured to compare-a designated address designated by the CPU and the partition address to output either a first comparison result or a second comparison result, the first comparison result indicating that the designated address designates the interleaved area, the second comparison result indicating that the designated address designates the non-interleaved area;
a bank selection signal generating unit configured to generate-a bank selection signal based on a least significant bit of the designated address to cause the non-volatile storage unit to alternately store data of consecutive addresses in the first bank and the second bank in units of words in the interleaved area, when the comparator outputs the first comparison result, and which generates the bank selection signal based on a high-order bit other than the least significant bit of the designated address to cause the non-volatile storage unit to consecutively store the data in the first bank or the second bank in the non-interleaved area up to a unit of a sector larger than a unit of the word, when the comparator outputs the second comparison result, and which supplies the non-volatile storage unit with the generated bank selection signal; and
a physical address generating unit configured to generate a physical address acquired by excluding the least significant bit from the designated address, when the comparator outputs the first comparison result, and which generates the physical address acquired by excluding the high-order bit from the designated address, when the comparator outputs the second comparison result, and which supplies the non-volatile storage unit with the generated physical address.

2. The address generating circuit according to claim 1, which is installed on a same chip with the non-volatile storage unit and the CPU.

3. The address generating circuit according to claim 2, wherein the CPU sets the partition address in the register in accordance with an instruction supplied from outside of the chip.

4. The address generating circuit according to claim 1, wherein the CPU sets the partition address in the register based on information stored in a ROM or the non-volatile storage unit.

5. The address generating circuit according to claim 2, wherein the CPU sets the partition address in the register based on information stored in a ROM or the non-volatile storage unit.

6. The address generating circuit according to claim 1, wherein the high-order bit is a bit of the designated address that represents a change in a data amount of the unit of the sector.

7. The address generating circuit according to claim 2, wherein the high-order bit is a bit of the designated address that represents a change in the data amount of the unit of the sector.

8. The address generating circuit according to claim 1, wherein the bank selection signal generating unit generates a least significant bit of the designated address as the bank selection signal when the comparator outputs the first comparison result, and generates a high-order bit other than the least significant bit of the designated address as the bank selection signal when the comparator outputs the second comparison result.

9. The address generating circuit according to claim 2, wherein the bank selection signal generating unit generates a least significant bit of the designated address as the bank selection signal when the comparator outputs the first comparison result, and generates a high-order bit other than the least significant bit of the designated address as the bank selection signal when the comparator outputs the second comparison result.

10. The address generating circuit according to claim 1, wherein the comparator outputs the first comparison result or the second comparison result based on magnitude relation between the designated address and the partition address.

11. The address generating circuit according to claim 2, wherein the comparator outputs the first comparison result or the second comparison result based on magnitude relation between the designated address and the partition address.

12. An address generating method comprising:
storing, in a register, a partition address indicating a boundary between an interleaved area and a non-interleaved area in a non-volatile storage unit, the non-volatile storage unit having a first bank and a second bank, the interleaved area being provided across the first bank and the second bank, the non-interleaved area being provided across the first bank and the second bank, a value of the partition address being rewritable by a CPU
comparing a designated address designated by the CPU and the partition address;
generate, in response to comparing the designated address and the partition address, a result, wherein the result comprises either a first comparison result or a second comparison result, the first comparison result indicating that the designated address designates the interleaved area, the second comparison result indicating that the designated address designates the non-interleaved area;
determining whether the result is the first comparison result or the second comparison result;
generating a bank selection signal based on a least significant bit of the designated address to cause the non-volatile storage unit to alternately store data of consecutive addresses in the first bank and the second bank in units of words in the interleaved area and generating a physical address acquired by excluding the least significant bit from the designated address, when the result is determined to be the first comparison result; and
generating the bank selection signal based on a high-order bit other than the least significant bit of the designated address to cause the non-volatile storage unit to consecutively store the data in the first bank or the second bank in the non-interleaved area up to a unit of a sector larger than a unit of the word and generating the physical address acquired by excluding the high-order bit from the designated address, when the result is determined to be the second comparison result.

13. The address generating method according to claim 12, wherein the CPU sets the partition address in accordance with an instruction supplied from outside of a chip on which the non-volatile storage unit and the CPU are installed.

14. The address generating method according to claim 12, wherein the CPU sets the partition address based on information stored in a ROM or the non-volatile storage unit.

15. The address generating method according to claim 13, wherein the CPU sets the partition address based on information stored in a ROM or the non-volatile storage unit.

16. The address generating method according to claim 12, wherein the high-order bit is a bit of the designated address that represents a change in a data amount of the unit of the sector.

17. The address generating method according to claim 13, wherein the high-order bit is a bit of the designated address that represents a change in a data amount of the unit of the sector.

18. The address generating method according to claim 12, wherein a least significant bit of the designated address is generated as the bank selection signal when the result is determined to be the first comparison result, and a high-order bit other than the least significant bit of the designated address is generated as the bank selection signal when the result is determined to be the second comparison result.

19. The address generating method according to claim 13, wherein a least significant bit of the designated address is generated as the bank selection signal when the result is determined to be the first comparison result, and a high-order bit other than the least significant bit of the designated address is generated as the bank selection signal when the result is determined to be the second comparison result.

20. The address generating method according to claim 12, wherein the first comparison result or the second comparison result is generated based on magnitude relation between the designated address and the partition address.

* * * * *